UNITED STATES PATENT OFFICE.

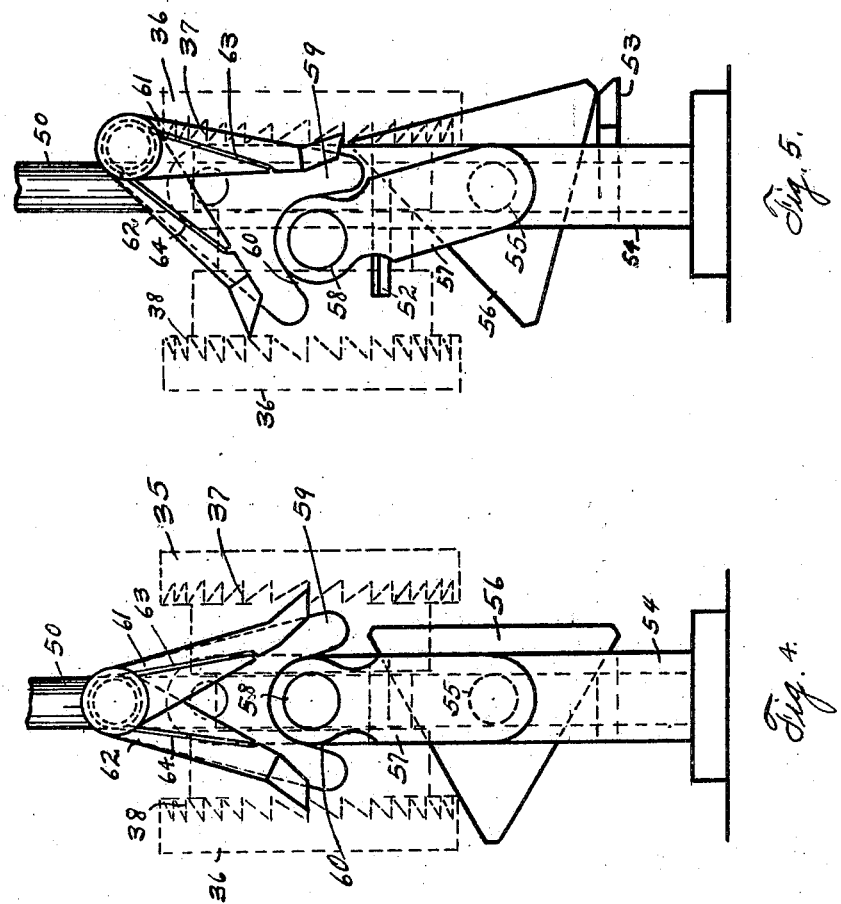

GEORGE W. DUNSWORTH, OF HOUSTON, TEXAS.

PIPE-PERFORATOR.

1,398,320.  Specification of Letters Patent.  Patented Nov. 29, 1921.

Application filed September 13, 1919. Serial No. 323,482.

*To all whom it may concern:*

Be it known that I, GEORGE W. DUNSWORTH, a citizen of the United States, residing at Houston, in the county of Harris and State of Texas, have invented certain new and useful Improvements in a Pipe-Perforator, of which the following is a specification.

This invention relates to new and useful improvements in a pipe perforator.

One object of the invention is to provide a machine of the character described which has been specially designed for the purpose of perforating pipes to be used in the manufacture of well screens, and for other similar purposes.

Another object of the invention is to provide a device of the character described which will operate automatically to perforate pipe with rows of perforations, the perforations of one row being in staggered relation to the perforations of the adjacent rows.

A further feature of the invention resides in the provision of a pipe perforator, which is adjustable so that pipes of different diameters may be perforated.

With the above and other objects in view, the invention has particular relation to certain novel features of construction, operation and arrangement of parts, an example of which is given in this specification and illustrated in the accompanying drawings, wherein.

Figure 1:
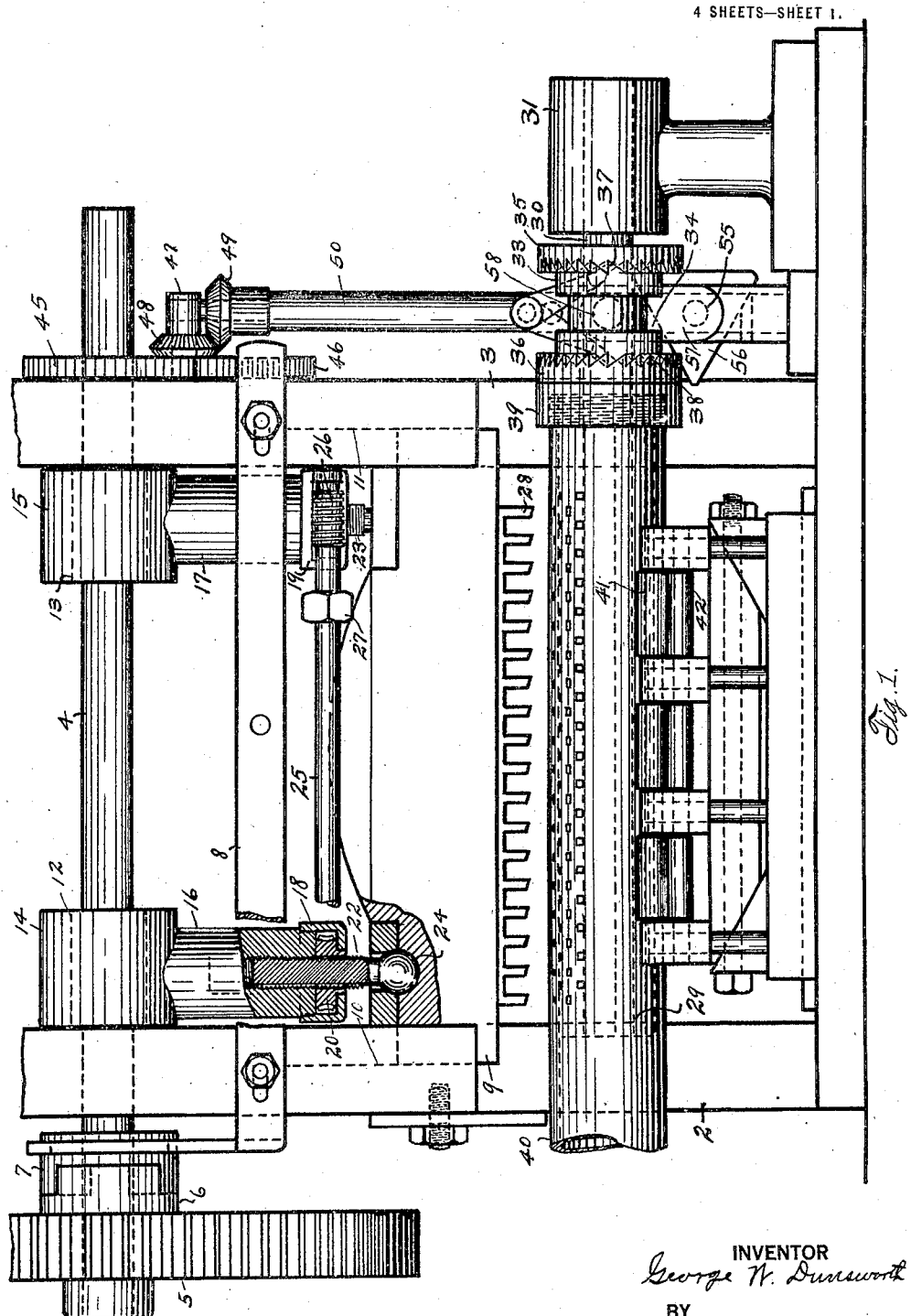
Figure 1, is a front elevation, shown partially broken away for better illustration.
Figure 2:
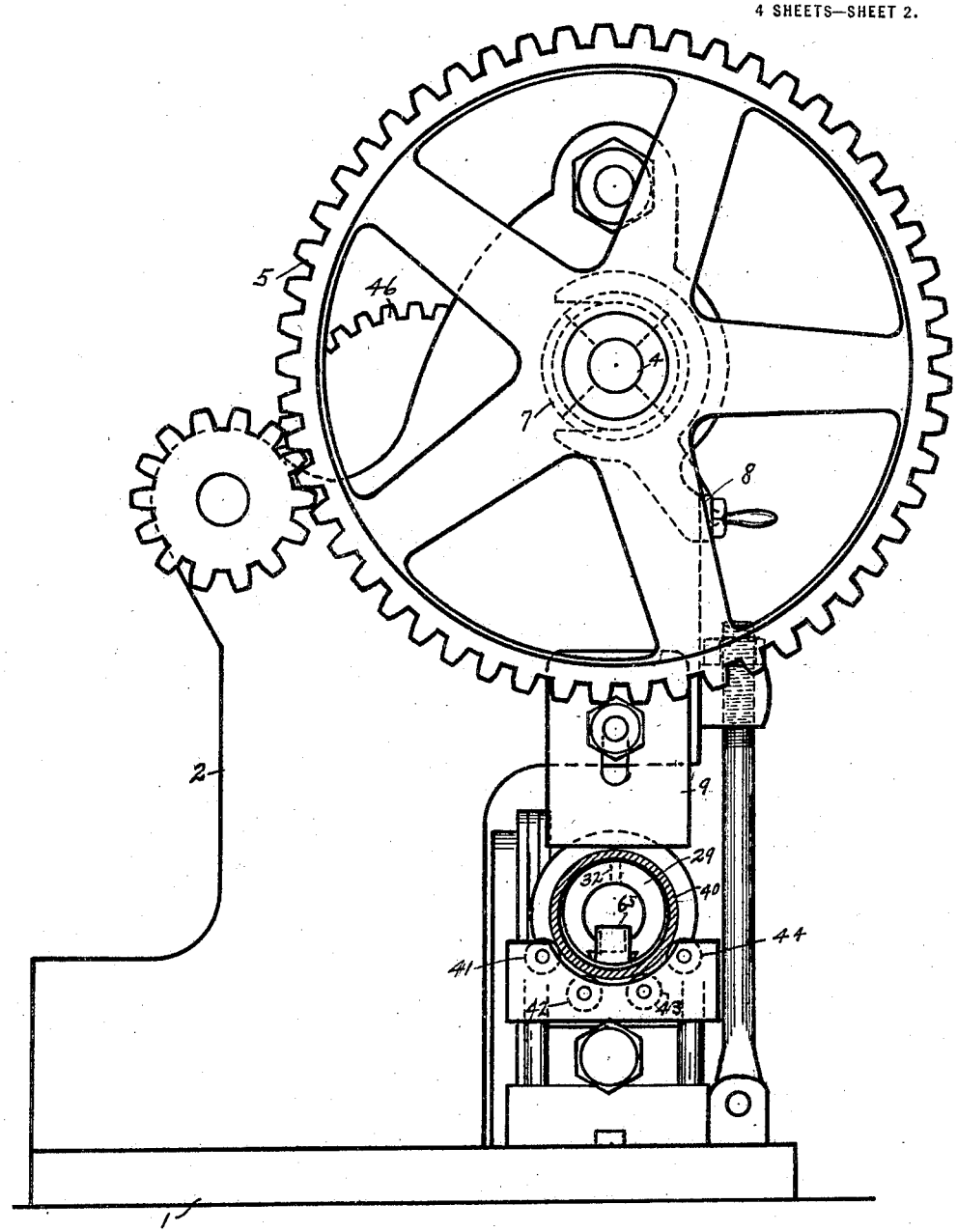
Fig. 2, is an end view.
Figure 3:
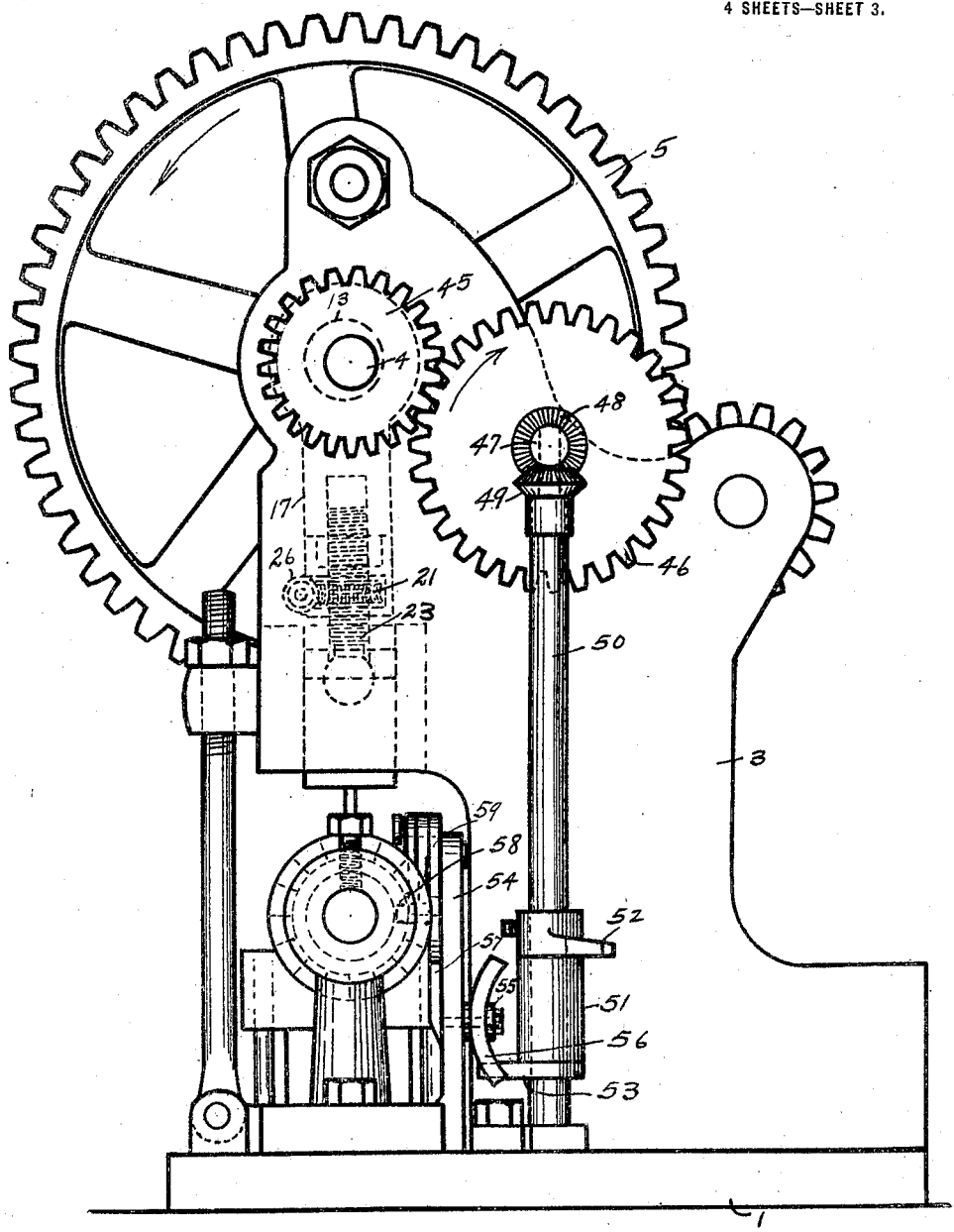
Fig. 3, is the opposite end view from that shown in Fig. 2.

Figs. 4, and 5, show enlarged end views, respectively, of the pipe shifting mechanism.

Referring now more particularly to the drawings, wherein like numerals of reference designate similar parts in each of the figures, the numeral 1, refers to the base of the framework and secured thereto, and upstanding therefrom, are the supporting end members 2 and 3, which are spaced apart. Rotatably mounted in suitable bearings in said members, is a transverse drive shaft 4, upon one end of which, there is loosely mounted the spur gear wheel 5, through which rotation may be imparted to said shaft. The inner end of the hub of this drive wheel is formed into a clutch member 6, which is adapted to be clutched with and declutched from the shaft through the clutch 7, which is splined thereon, and which may be moved into and out of mesh with the clutch member 6, by means of the adjustable shifting bar 8, which is mounted on the end members 2 and 3, and is capable of adjustment relative thereto. The numeral 9, refers to a cross head whose respective ends move in the long vertical bearings 10, and 11, cut in the inner sides of the end members 2 and 3. Fixed upon the shaft 4, are the eccentrics 12 and 13, which operate in corresponding bearings 14 and 15, said bearings being formed with depending sleeves 16 and 17, and threaded onto the lower end of said sleeves are the respective cup-shaped caps 18 and 19, which retain in position against the lower ends of said sleeves, the screw gears 20 and 21. Splined through these respective gears 20 and 21 are the outwardly threaded rods 22 and 23, respectively, which are threaded up into the sleeves 16 and 17, and the rods 22 and 23 are connected to the cross head 9 by means of ball and socket bearings as 24. A transverse shaft 25 has end bearings in the respective caps 18 and 19, and is formed into screw gear sections 26, which are in mesh with the respective screw gears 20 and 21. The shaft 25 has a hexagonal section 27, by means of which it may be turned with a wrench to rotate the screw gear wheels 20 and 21, and thereby adjust the cross head so as to accommodate it to pipes of different sizes.

Depending from the cross head is a row of punches 28, which are graduated in length, so that the perforations of the row will be cut successively, rather than simultaneously, thus requiring less power. Underneath the cross head 9, there is a tubular die 29, one end of which is reduced forming the neck 30, said reduced end being secured in the anchor 31. This die is formed with a row of perforations 32, adapted to register with the punches 28. Rotatably mounted upon the reduced neck 30, there is a sleeve 33, having the annular groove 34, cut therein and detachably mounted on the respective ends of this sleeve, there are the respective disks 35 and 36, which are spaced apart and whose inner sides are formed into ratchet faces 37 and 38, respectively. The disk 36 is extended and formed into an internally threaded chuck 39, and the pipe 40 to be perforated is fitted over the die 29, and its adjacent end is threaded into said chuck. Underneath the chuck, there is a plurality of roller bearings as 41, 42, 43, and 44, upon which the pipe 40 rests while being operated on.

Fixed upon the shaft 4 opposite the spur gear wheel 5, there is a small spur gear wheel 45, which is in mesh with the larger gear wheel 46. This latter gear wheel is fixed upon a short shaft 47, which has a bearing in the end member 3, and upon said shaft, there is fixed the pinion 48, which is in mesh with the corresponding pinion 49, fixed upon the upper end of the vertical shaft 50. The lower end of the shaft 50 has a bearing in the base 1, and keyed thereon is the sleeve 51, which has the fingers 52 and 53, arranged at its upper and lower ends respectively, and projects out laterally in opposite directions. These fingers are provided for a purpose to be hereinafter stated.

Upstanding from the base 1, there is a standard 54, which has a bearing in which the short shaft 55 operates and fixed to the outer end of this shaft, there is a triangular shaped rocker 56. To the inner end of the shaft 55, the arm 57 is fixed, whose upper free end has the inwardly projecting stud 58, which projects into the groove 34 of the sleeve 33. As the shaft 50 rotates, the fingers 52 and 53, alternately, strike against the upper and lower ends, respectively, of the rocker 56, and oscillate the same, which in turn, oscillate the arm 57, and moves the sleeve 33 back and forth on the neck 30 of the die 29, with the result that the pipe is moved back and forth on said die. Pivoted to the upper end of the standard 54, is a yoke 59, whose lower end has an arcuate notch 60, into which the rounded off free end of the arm 57 fits, and said arm, as it oscillates back and forth, also oscillates said yoke. The upper end of this yoke has the oppositely disposed dogs 61 and 62, pivoted thereto, which are held in engagement with the respective rack faces 37 and 38, by means of the push springs 63 and 64. As the yoke 59 is oscillated, said dogs alternately engage with the corresponding rack faces of the corresponding disks 35 and 36, and successively impart partial rotations thereto, which are transmitted to the pipe to be perforated by the chuck 39.

In operation, the pipe is placed in position over the die and screwed into the chuck 39, and the machine is then started. Under the influence of the cams 12 and 13, the cross head will be reciprocated up and down. Upon down stroke, a row of perforations will be cut by the punches 28 through the pipe, and the material cut away will fall into the long sliding trough 65, which is contained within the die 29, and which when filled may be readily withdrawn and emptied. Upon up stroke of the cross head 9, the punches will be withdrawn and the pipe will be moved a distance lengthwise on the die through the oscillation of the lever 57, and at the same time, will be partially rotated through the operation of the dogs 61 and 62. On the next down stroke, of the cross head, another row of perforations will be cut, which, on account of the lengthwise movement of the pipe, will be staggered in their relation to the first row, and which, by reason of the partial rotation of the pipe, will be spaced the required distance therefrom, and this operation will continue automatically until the pipe has been perforated all the way around.

What I claim is:

1. A pipe perforator, including a tubular die, disposed to receive the pipe, which is fitted thereover, roller bearings wherein the pipe rests, a row of punches opposing said die, means for simultaneously reciprocating said punches into coöperation with the die, whereby a row of perforations is cut through the pipe, a jaw to which said pipe is secured, a pair of annular ratchets carried by said jaw, an oscillating yoke, dogs carried by said yoke and alternately engaging with the respective ratchets for imparting successive partial rotations to the pipe following the successive withdrawals of the punches therefrom.

2. A pipe perforator, including a tubular mandrel forming a die, disposed to receive the pipe to be perforated, bearings disposed to support the pipe and whereon the pipe rotates, a cross head provided with a plurality of alined punches, arranged to coöperate with said die, means for reciprocating said cross head, a jaw to which said pipe is secured, a pair of annular ratchets carried by said jaw, an oscillating yoke, dogs carried by said yoke and alternately engaging with the respective ratchets for imparting partial rotations to said pipe relative to the die.

3. A pipe perforator, including a tubular mandrel, provided with a row of perforations and forming a die, disposed to receive the pipe to be perforated, a cross head provided with a plurality of alined punches, arranged to coöperate with said die and penetrate the pipe, forming a row of perforations therein, means for reciprocating said cross head, a jaw to which said pipe is secured, a pair of annular ratchets carried by said jaw, an oscillating yoke, dogs carried by said yoke and alternately engaging with the respective ratchets for imparting partial rotations to said pipe relative to the die, roller bearings whereon the pipe rests, and means in operative connection for imparting successive endwise movements, in opposite directions, to the pipe during the partial rotations thereof.

4. A device for perforating pipe, including a hollow mandrel forming a die disposed to receive the pipe, a jaw to which said pipe is secured, a pair of annular ratchets carried by said jaw, an oscillating yoke, dogs carried by said yoke and alternately engaging with the respective ratchets for imparting partial rotations, successively, to the pipe, means in operative connection with the jaw for oscillating the pipe back and forth on the die simultaneously with the partial rotations thereof, a plurality of punches arranged to coöperate with the die to perforate said pipe, a removable sliding trough fitted into the mandrel to receive the cuttings punched from the pipe, and means for reciprocating said punches into and out of coöperation with the die intermediate the partial rotations of the pipe.

5. A device for perforating pipe, including a tubular pipe support provided with a row of perforations forming a die, disposed to receive the pipe, a jaw to which said pipe is secured, a pair of annular ratchets carried by said jaw, an oscillating yoke, dogs carried by said yoke and alternately engaging with the respective ratchets for imparting partial rotations successively to the die, means for oscillating the pipe back and forth on the die simultaneously with the partial rotations thereof, a cross head, a plurality of graduated punches carried by said cross head and arranged to coöperate with the die to perforate said pipe, means for reciprocating said punches into and out of coöperation with the die intermediate the partial rotations of the pipe, roller bearings disposed to support the pipe and a sliding removable trough in the support.

6. A device for perforating pipe, including a tubular support provided with a row of perforations and forming a die disposed to receive the pipe, roller bearings whereon the pipe rests, a jaw to which said pipe is secured, a pair of annular ratchets carried by said jaw, an oscillating yoke, dogs carried by said yoke and alternately engaging with the respective ratchets for imparting pipe rotations successively to the pipe, a cross head, a plurality of punches carried by said cross head and alined with said perforations, means for reciprocating said cross head intermediate the partial rotations of the pipe and a removable trough fitted within said support.

In testimony whereof I have signed my name to this specification in the presence of two subscribing witnesses.

GEORGE W. DUNSWORTH.

Witnesses:
E. V. HARDWAY,
WILL B. FOX.